United States Patent [19]

Bleck et al.

[11] Patent Number: 4,956,978
[45] Date of Patent: Sep. 18, 1990

[54] TRANSPORT REFRIGERATION APPARATUS HAVING SOUND REDUCTION COVER

[75] Inventors: Gregory D. Bleck, Chaska; Peter B. Allard, Minnetonka, both of Minn.

[73] Assignee: Thermo King Corporation, Minneapolis, Minn.

[21] Appl. No.: 404,038

[22] Filed: Sep. 7, 1989

[51] Int. Cl.⁵ .............................................. B60H 1/32
[52] U.S. Cl. ........................................ 62/239; 62/296
[58] Field of Search ................. 62/239, 296, 507, 428, 62/429

[56] References Cited

U.S. PATENT DOCUMENTS

| | | | |
|---|---|---|---|
| 2,321,772 | 6/1943 | Philipp | 62/296 |
| 2,932,956 | 4/1960 | Chieregatti | 62/296 |
| 2,989,855 | 6/1961 | Thompson | 62/296 |
| 3,500,655 | 3/1970 | Lyons | 62/507 X |
| 3,748,997 | 7/1973 | Dean, Jr. et al. | 62/296 X |
| 3,968,837 | 7/1976 | Makara | 62/296 X |
| 4,586,349 | 5/1986 | Ohishi | 62/296 |

Primary Examiner—William E. Tapolcai
Attorney, Agent, or Firm—D. R. Lackey

[57] ABSTRACT

A transport refrigeration unit having a top and bottom, a back, and side planes which include a front and first and second sides. The transport refrigeration unit further includes a condenser having air intake openings along a selected side plane of the unit, with condenser air being discharged through the top. A sound reducing cover is disposed to surround the transport refrigeration unit. The sound reducing cover is lined with a sound absorbing material, and it re-positions the condenser air intake such that incoming condenser air enters the unit through the top, instead of through a side plane, while maintaining top air discharge. In one embodiment the sound reducing cover separates incoming and exiting air in a direction from the front to the back of the unit, and in another embodiment in a direction from one side of the unit to the other side.

13 Claims, 3 Drawing Sheets

TRANSPORT REFRIGERATION APPARATUS HAVING SOUND REDUCTION COVER

TECHNICAL FIELD

The invention relates in general to refrigeration systems, and more specifically to transport refrigeration systems suitable for mounting on a truck.

BACKGROUND ART

Truck mounted transport refrigeration units commonly include a compressor, a prime mover for the compressor, a condenser, an evaporator, and associated condenser and evaporator fans and blowers, all mounted in a single compact unit. Air for removing heat from the condenser is commonly drawn into a selected side plane of the unit, such as the front plane or one of the side planes, and the heated condenser air is discharged through the top of the unit.

The compressor prime mover is normally an internal combustion engine, such as a Diesel engine. While transport refrigeration units are carefully designed to reduce sound emissions, the engine, compressor and fans may produce noise which exceeds statutory legal sound emissions of some jurisdictions.

Thus, it would be desirable and it is an object of the present invention to provide transport refrigeration units for trucks which produce a lower noise or sound level, measured on the ground below and surrounding an associated truck, than conventional transport refrigeration units of the prior art.

SUMMARY OF THE INVENTION

Briefly, the present invention is a transport refrigeration unit suitable for mounting on the nose of a truck. The transport refrigeration unit includes top and bottom portions and side planes therebetween which include a front and first and second sides. The unit also includes a back plane which mounts against the associated truck, with an evaporator extending through the back plane into a served space defined by the truck. A condenser is included in the unit which has air intake openings located along a selected side plane, with heated condenser air being discharged through the top portion of the unit.

A sound reducing cover surrounds the transport refrigeration unit, which may be retro-fitted to an existing unit in the field by removing the conventional unit cover; or it may be factory applied in place of a conventional unit cover. The sound reducing cover directs noise from the unit upwardly and away from ground level surrounding the associated truck. Sound which normally exits the unit through the side planes and bottom, including the side plane associated with laterally disposed condenser air intake openings, is reduced in magnitude by solid walls of the sound reducing cover which are lined internally with a sound absorbing material.

The solid wall of the cover adjacent to the condenser air intake openings is laterally spaced therefrom to define a vertically extending condenser air inlet duct having an open upper end and a closed lower end.

A top portion of the sound reducing cover defines a condenser air discharge path having an opening in communication with the condenser air discharge opening which extends through or is defined by the top portion of the unit, and it also functions to separate the open upper end of the condenser air inlet duct from the condenser air discharge path. In a first embodiment of the invention, the top portion of the sound reducing cover includes a plurality of louvers which deflect the condenser discharge air, as well as air heated by other components of the unit, towards the back of the unit away from the open upper end of the condenser air inlet duct, which is at the front of the unit, to prevent short circuiting of the heated discharge air back through the condenser. In a second embodiment of the invention, instead of separating incoming and exiting air from front to back, the two air paths are separated from side-to-side, with the air entering the condenser end of the unit and exiting from the compressor and prime mover end.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
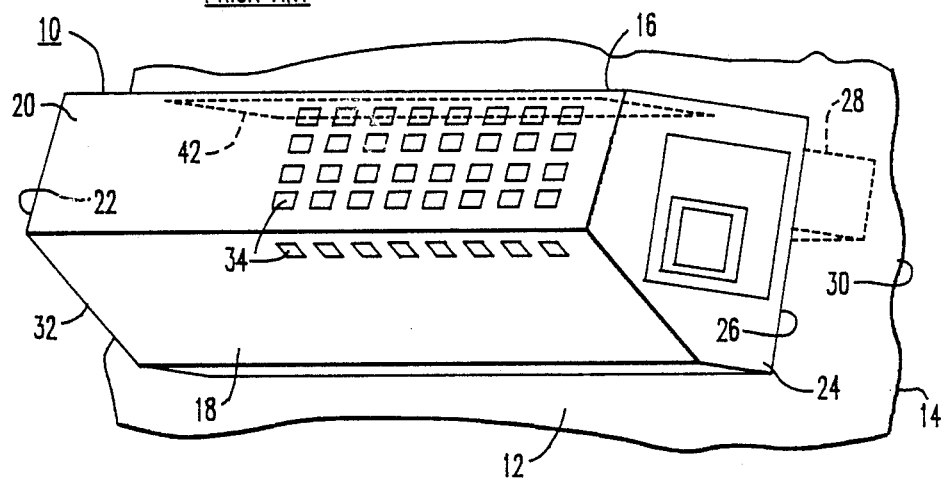
FIG. 1 is a perspective view of a typical transport refrigeration unit of the prior art.

Referring now to the drawings, and to FIG. 1 in particular, there is shown a typical transport refrigeration unit 10 of the prior art mounted on the nose 12 of a truck 14. Unit 10 has top and bottom portions 16 and 18, respectively, and substantially vertically oriented side planes extending therebetween, including a front 20 and first and second sides or ends 22 and 24, respectively. Unit 10 has an elongated configuration, extending in a direction between the first and second sides or ends 22 and 24, with one end, such as the first end 22, having a refrigerant compressor and compressor prime mover (not shown) adjacent thereto, and with the remaining end, such as end 24, having a condenser 36, shown in FIGS. 3, 5 and 6, associated therewith. Unit 10 also includes a back plane or side 26 disposed against truck nose 12. An evaporator 28 extends from back side 26 through an opening in nose 12 and into a served space 30 defined by truck 14.

Unit 10 has a conventional cover 32 formed of metal or plastic, with cover 32 having a plurality of openings 34 in a side plane adjacent to the refrigerant condenser 36. In the unit 10 of FIG. 1, and in the unit 10' and 10" as modified in FIGS. 3, 5 and 6, the condenser 36 has laterally disposed air intake openings 38 disposed in a substantially vertical plane adjacent to the front plane of the unit. Thus, in the prior art exemplified by FIG. 1, air inlet openings 34 are disposed in cover 32 such that they are in the front 20 of unit 10, directly adjacent to condenser air intake openings 38. Air drawn into condenser 36 through condenser air intake openings 38 picks up heat in the condenser 36 and exits from a rear condenser air discharge plane 40 from which it passes through condenser fans or blowers (not shown) and is discharged through an opening 42 in the top portion 16 of unit 10.

Some transport refrigeration units may have laterally disposed condenser air intake openings facing one of the ends or sides 22 or 24, but for purposes of example, the present invention will be described relative to a forwardly facing condenser.

Figure 2:
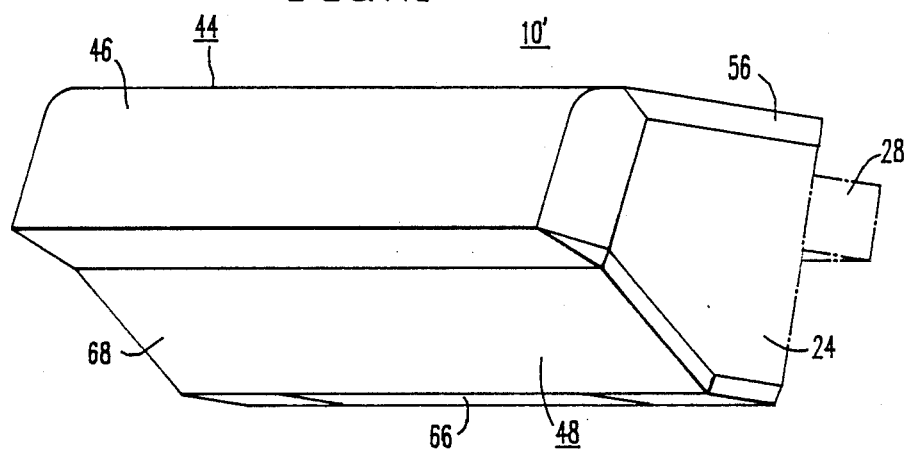
FIG. 2 is a perspective view similar to that of FIG. 1, except illustrating the transport refrigeration unit of FIG. 1 with a sound reducing cover mounted thereon which is constructed according to the teachings of the invention.

The noises or sounds generated by an internal combustion engine, compressor, fans, and blowers (not shown) radiate outwardly towards the ground surrounding truck 14 through cover 32, and especially through the air flow passages 38 of the condenser 36 and cover openings 34. The present invention provides a sound cover 44 shown in perspective views in FIGS. 2, 3 and 6, with sound cover 44 replacing the conventional cover 32. Sound cover 44 may be retro-fitted to transport refrigeration unit 10 in the field by removing the conventional cover 32; or it may be factory applied in place of the conventional cover. Unit 10, modified with sound cover 44, will be referred to as unit 10'.

Sound cover 44 is devoid of openings which would emit sound directly outward from the bottom portion 18 and side planes 20, 22 or 24 of the unit 10'. In order to accomplish this, sound cover 44 re-positions the location of the condenser air intake from a side plane, such as the front 20, to the top portion 16 of unit 10'.

For ease in manufacturing sound cover 44, as well as for servicing unit 10', in a preferred embodiment of the invention sound cover 44 is constructed of three basic members, including a substantially U-shaped front cover member 46, a bottom cover member 48, and a top cover member 50. While metal may be used to construct the sound cover members, since, as will be hereinafter explained, all internal surfaces susceptible to receiving a sound absorbing liner will be so covered, in a preferred embodiment of the invention the cover members are formed of plastic, such as fiberglass formed to shape in a suitable mold.

Figure 4:
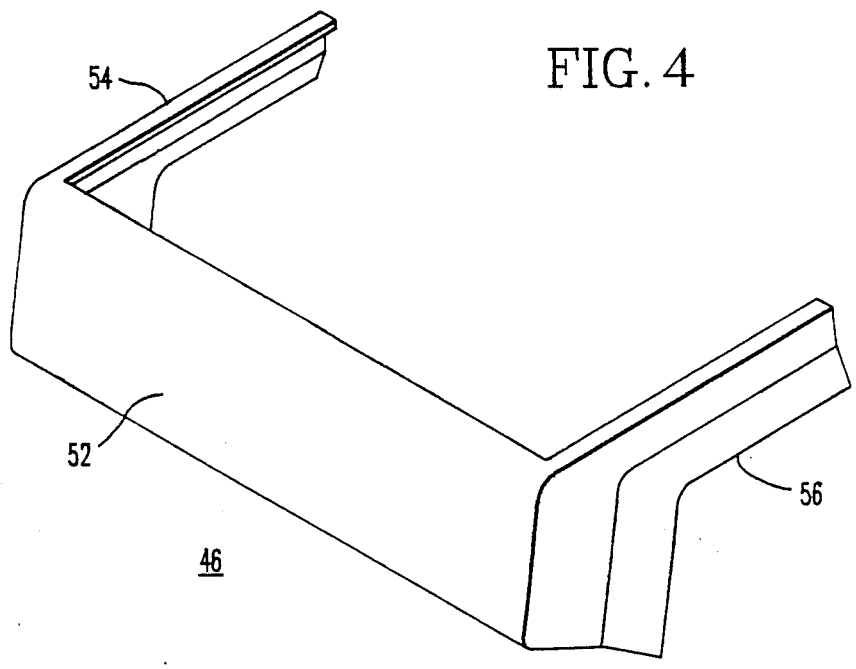
FIG. 4 is a perspective view of a front cover member of the sound reducing cover shown in FIGS. 2 and 3.

The U-shaped front cover member 46, best shown in perspective in FIG. 4, includes a substantially vertically extending front portion 52 which is devoid of openings, and first and second side portions 54 and 56, respectively. The first and second sides 22 and 24 of unit 10 are usually integral functional portions of unit 10, such as for supporting refrigeration components and electrical controls which require quick and easy access, and thus the conventional cover 32 usually extends over a small portion of sides 22 and 24. The first and second side portions 54 and 56 of front cover member 46 contact sides 22 and 24, but they are configured to expose the portions of sides 22 and 24 which require easy access.

Figure 3:
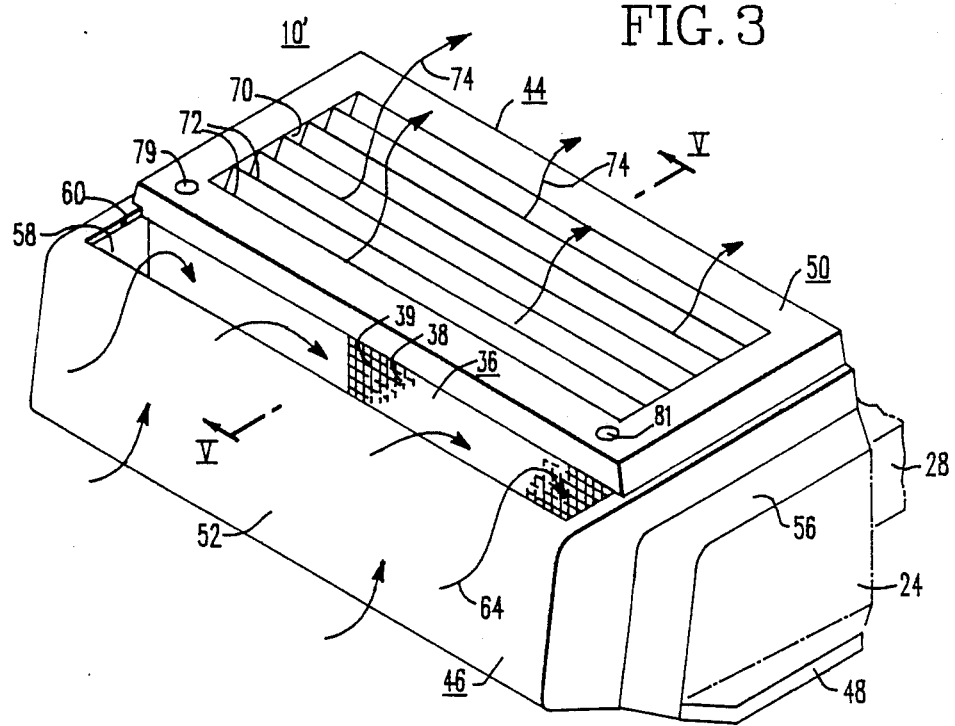
FIG. 3 is a perspective view of the transport refrigeration unit of FIG. 2, which illustrates the top portion of the sound reducing cover constructed according to a first embodiment of the invention.
Figure 5:
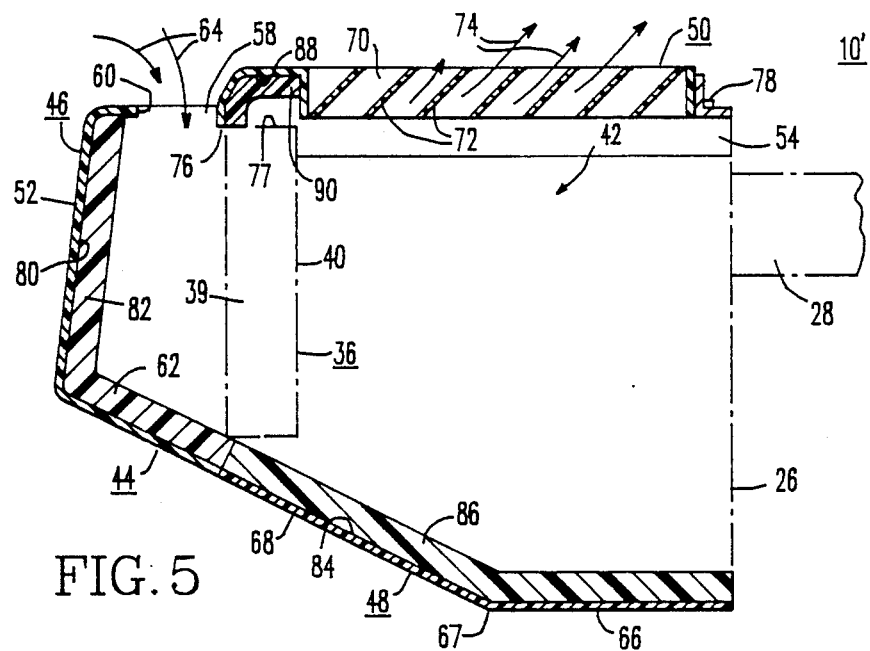
FIG. 5 is a cross sectional view of the sound reducing cover shown in FIGS. 2 and 3, taken between and in the direction of arrows V—V in FIG. 3.
Figure 6:
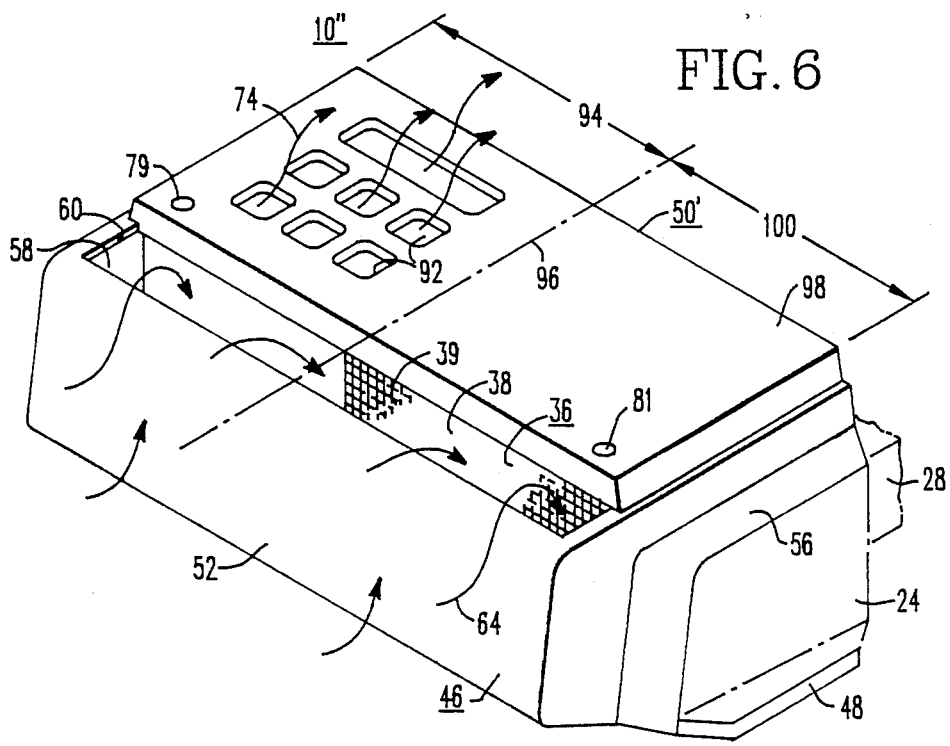
FIG. 6 is a perspective view similar to FIG. 3, except illustrating the top portion of the sound reducing cover constructed according to a second embodiment of the invention.

As shown in the cross-sectional view of unit 10' in FIG. 5, taken between and in the direction of arrows V-V in FIG. 3, the front cover member 46 is dimensioned such that the front portion 52 extends outwardly in spaced relation from the laterally disposed air intake openings 38 of condenser 36. This lateral spacing of front portion 52, in cooperation with the front air intake plane of condenser 36 on which plane air intake openings 38 are disposed, defines a vertically extending condenser air inlet duct 58 having an open upper end 60 and a closed lower end 62. Thus, condenser intake air is drawn into unit 10' via opening 60, as indicated by arrow 64, instead of through a vertical extending side plane, such as through the front portion 20 of unit 10.

Bottom cover member 48, which is also devoid of openings, covers the bottom portion 18 of unit 10', closely following the contour of the conventional bottom portion 18. The conventional bottom portion 18 of unit 10, however, is removed, as are all other conventional cover portions, before sound cover 44 is applied to unit 10. Bottom portion 48, as best shown in FIG. 5, may have a substantially horizontally extending portion 66 which, at a bend line 67, is integrally joined to a portion 68 which angles upwardly to smoothly butt against the lowermost portion of the front cover member 46. The upward angle provides clearance for tilt cabs.

Top cover member 50 defines a condenser air discharge path having an opening 70 in communication with the condenser air discharge opening 42 defined by the top portion 16 of unit 10'. In this embodiment of top cover member 50, the condenser intake air 64 is separated from condenser discharge air, indicated by arrows 74, from the front towards the back of unit 10'. In a preferred embodiment of top cover member 50, a plurality of louvers 72 are disposed in spaced relation across opening 70, with the louvers 72 being angled to direct condenser discharge air 74 away from the upper open end 60 of the condenser air inlet duct 58 located at the front of unit 10'. Thus, fresh air 64 may enter the condenser 36 from the top of the sound cover 44, adjacent to the front edge of the top cover member 50, and heated air exiting top portion 50 is directed towards the back of the unit 10'. This prevents heated discharge air 74 from being drawn back into the inlet duct 58.

As clearly shown in FIG. 5, top portion 50 includes a forward edge 76 which contacts and seals against an upper portion 77 of condenser 36, to separate the condenser air inlet duct 58 from the air 74 being discharged from condenser 36. This prevents air 74 being discharged from unit 10' from returning to the intake side of condenser 36 within or inside of unit 10'. Also, as shown in FIG. 5, top cover portion 50 is preferably hingedly attached to the front cover member 46, via hinges, such as hinge 78. Thus, top cover member 50 may be unlatched from a locked position, such as via latches 79 and 81, and pivoted from the operative position illustrated in the Figures to a service or maintenance position which provides easy access to the refrigeration components.

In order to absorb sound, as well as directing sound upwardly and away from the ground surrounding the truck 14, the internal surfaces of sound cover 44 are lined with a suitable sound absorbing material, such as a plastic foam. More specifically, the front cover member 46 has an internal surface 80 to which sound absorbing insulation 82 is fixed, the bottom cover member 48 has an internal surface 84 to which sound absorbing insulation 86 is attached, and the top cover member 50 has an internal surface 88 to which sound absorbing insulation 90 is attached. The louvers 72 are also covered with a sound absorbing material, such as a foam skin covered with a thin layer of plastic impervious to moisture.

Instead of separating intake air 64 and exit air 74 from the front to the back of the associated transport refrigeration unit 10', top cover member 50 may be constructed to separate the intake air 64 and exit air 74 from one side or end of unit 10' to the other. This embodiment of the invention is set forth in FIG. 6, with the top cover member being referenced 50' and the transport refrigeration unit having cover member 50' being referenced 10".

More specifically, as hereinbefore stated, condenser 36 is mounted near the second end 24 of the elongated unit 10, and the refrigerant compressor and associated prime mover are mounted near the opposite end 22. Cover 50' defines one or more openings 92 disposed over the compressor and prime mover end 94 of unit 10", which is the end to the left of the broken line 96, with the portion 98 of cover member 50' which covers the condenser end 100 of cover member 50' being devoid of openings. Most of the condenser intake air 64 will enter the duct 58 adjacent to the front air intake plane 69 of condenser 36 because of the condenser fans located immediately adjacent to the discharge plane 40, with there being little tendency for the discharge air 74 to re-enter duct 58 at the compressor and prime mover end of duct 58.

While both embodiments of cover member 50 and 50' reduce the sound level surrounding units 10' and 10" without reducing the capacity of the unit, the sound level is slightly lower when the sound cover 44 uses cover member 50' of the second embodiment than when the cover member 50 of the first embodiment is used. Apparently the solid portion 98 of cover member 50' functions as a muffler surrounding the condenser fans and blowers.

Unit 10 shown in FIG. 1 with a conventional cover was mounted on a truck and operated at the higher of two selectable prime mover speeds, i.e., 2200 RPM, and sound measurements were taken at 8 locations on the ground surrounding the truck and averaged. The average was 70.8 db. The same unit 10 had the conventional cover removed and replaced with sound cover 44, with sound cover 44 having top cover member 50' of the FIG. 6 embodiment. The modified unit 10" was operated at the same high speed. Sound measurements taken at the same 8 locations produced an average of 66.5 db, a significant improvement.

In summary, there has been shown and described a transport refrigeration unit having a sound reducing cover 44 which reduces sound emissions directed towards the ground surrounding an associated truck. The sound reducing cover 44 is only slightly larger than the conventional cover 32, by the thickness of the sound insulation chosen to line the internal surfaces of the sound cover, and by the dimension selected for the condenser air inlet duct 58. Sound generated by unit 10' is reduced by absorbing sound directed towards the ground through the sides and bottom of the cover, and by directing sound upwardly through the top portion of the unit 10'.

We claim:

1. In a transport refrigeration unit having top and bottom portions and side planes therebetween which include a front and first and second sides, a condenser having laterally disposed air intake openings located along a selected side plane of the unit, and a condenser air discharge opening at the top portion of the unit, the improvement comprising:

a sound reducing cover on said transport refrigeration unit,
said sound reducing cover being devoid of openings which emit sound directly outward from the side planes of the unit,
said sound reducing cover including means for directing air to the laterally disposed air intake openings of the condenser from the top portion of the unit,
said air intake openings of the condenser being disposed along the front of the unit, with the sound reducing cover including a substantially U-shaped front cover member, and a top cover member,
said U-shaped front cover member being the means which directs air to the laterally disposed air intake openings of the condenser,
said U-shaped front cover member including a front portion devoid of openings, and first and second side portions,
said first and second side portions contacting the first and second sides, respectively, of the transport refrigeration unit,
said U-shaped front cover member being dimensioned such that the front portion thereof is spaced outwardly from the laterally disposed condenser air intake openings to define a vertically extending condenser air inlet duct having an open upper end and a closed lower end,
said top cover member extending between the first and second side portions of the U-shaped front cover member without blocking the open upper end of the condenser air inlet duct,
said top cover member defining a condenser air discharge path having an opening in communication with the condenser air discharge opening at the top portion of the transport refrigeration unit,
whereby air is drawn downwardly through the open upper end of the condenser air inlet duct, through the condenser, and is discharged upwardly through the opening defined by the top cover member.

2. The transport refrigeration unit of claim 1 wherein the opening defined by the top cover member includes a plurality of louvers oriented to direct condenser discharge air away from the front portion of the U-shaped front cover member, to prevent short circuiting of the condenser discharge air back into the open upper end of the condenser air inlet duct.

3. The transport refrigeration unit of claim 1 wherein the U-shaped front cover member and the top cover member define internal surfaces, and including sound absorbing means fixed to at least certain of said internal surfaces.

4. The transport refrigeration unit of claim 1 wherein the top cover member is hingedly attached to the U-shaped front cover member, enabling the top cover member to be pivoted between operative and service positions.

5. The transport refrigeration unit of claim 1 including a bottom cover member disposed to cover the bottom portion of the transport refrigeration unit, extending between the first and second side portions to the front portion of the U-shaped front cover member.

6. The transport refrigeration unit of claim 5 wherein the U-shaped front cover member, the bottom cover member and the top cover member define internal surfaces, and including sound absorbing means fixed to at least certain of said internal surfaces.

7. The transport refrigeration unit of claim 1 wherein the top cover member contacts the condenser of the transport refrigeration unit, to separate the condenser air inlet duct from the condenser air discharge path defined by the top cover member.

8. In a transport refrigeration unit having top and bottom portions and side planes therebetween which include a front and first and second sides, a condenser having laterally disposed air intake openings located along a selected side plane of the unit, and a condenser air discharge opening at the top portion of the unit, the improvement comprising:

a sound reducing cover on said transport refrigeration unit, said sound reducing cover being devoid of openings which emit sound directly outward from the side planes of the unit, said sound reducing cover including means for directing air to the laterally disposed air intake openings of the condenser from the top portion of the unit, said unit being elongated in a direction between the first and second sides, including a compressor and prime mover portion adjacent to the first side and a condenser portion adjacent tot he second side, with the air intake openings of the condenser being disposed along the front of the unit on the condenser side, and with the sound reducing cover including a substantially U-shaped front cover member, and a top cover member, said U-shaped front cover member being the means which directs air to the laterally disposed air intake openings of the condenser, said U-shaped front cover member including a front portion devoid of openings, and first and second side portions, said first and second side portions contacting the first and second sides, respectively, of the transport refrigeration unit, said U-shaped front cover member being dimensioned such that the front portion thereof is spaced outwardly from the laterally disposed condenser air intake openings to define a vertically extending condenser air inlet duct having an open upper end and a closed lower end, said top cover member extending between the first and second side portions of the U-shaped front cover member, over both the compressor and prime mover end and the condenser end, without blocking the open upper end of the condenser air inlet duct, said top cover member defining a condenser air discharge path located over the compressor and prime mover end of the unit, with the portion of the cover member disposed over the condenser end being devoid of openings, whereby air is drawn downwardly through the open upper end of the condenser air inlet duct to the condenser side of the unit, through the condenser, and is directed from the condenser end of the unit to the compressor and prime mover end where it is discharged upwardly through the opening defined by the top cover member.

9. The transport refrigeration unit of claim 8 wherein the U-shaped front cover member and the top cover member define internal surfaces, and including sound absorbing means fixed to at least certain of said internal surfaces.

10. The transport refrigeration unit of claim 8 wherein the top cover member is hingedly attached to the U-shaped front cover member, enabling the top cover member to be pivoted between operative and service positions.

11. The transport refrigeration unit of claim 8 including a bottom cover member disposed to cover the bottom portion of the transport refrigeration unit, extending between the first and second side portions to the front portion of the U-shaped front cover member.

12. The transport refrigeration unit of claim 11 wherein the U-shaped front cover member, the bottom cover member and the top cover member define internal surfaces, and including sound absorbing means fixed to at least certain of said internal surfaces.

13. The transport refrigeration unit of claim 8 wherein the top cover member contacts the condenser of the transport refrigeration unit, to separate the condenser air inlet duct from the condenser air discharge path defined by the top cover member.

* * * * *